April 12, 1949. O. A. SCHOENING 2,467,158
MACHINE FOR REMOVING MEAT FROM SHELLS
Filed April 27, 1946 4 Sheets-Sheet 1

INVENTOR.
ORLANDO ATLANTIS SCHOENING
BY
Edgar H. Kent
ATTORNEY

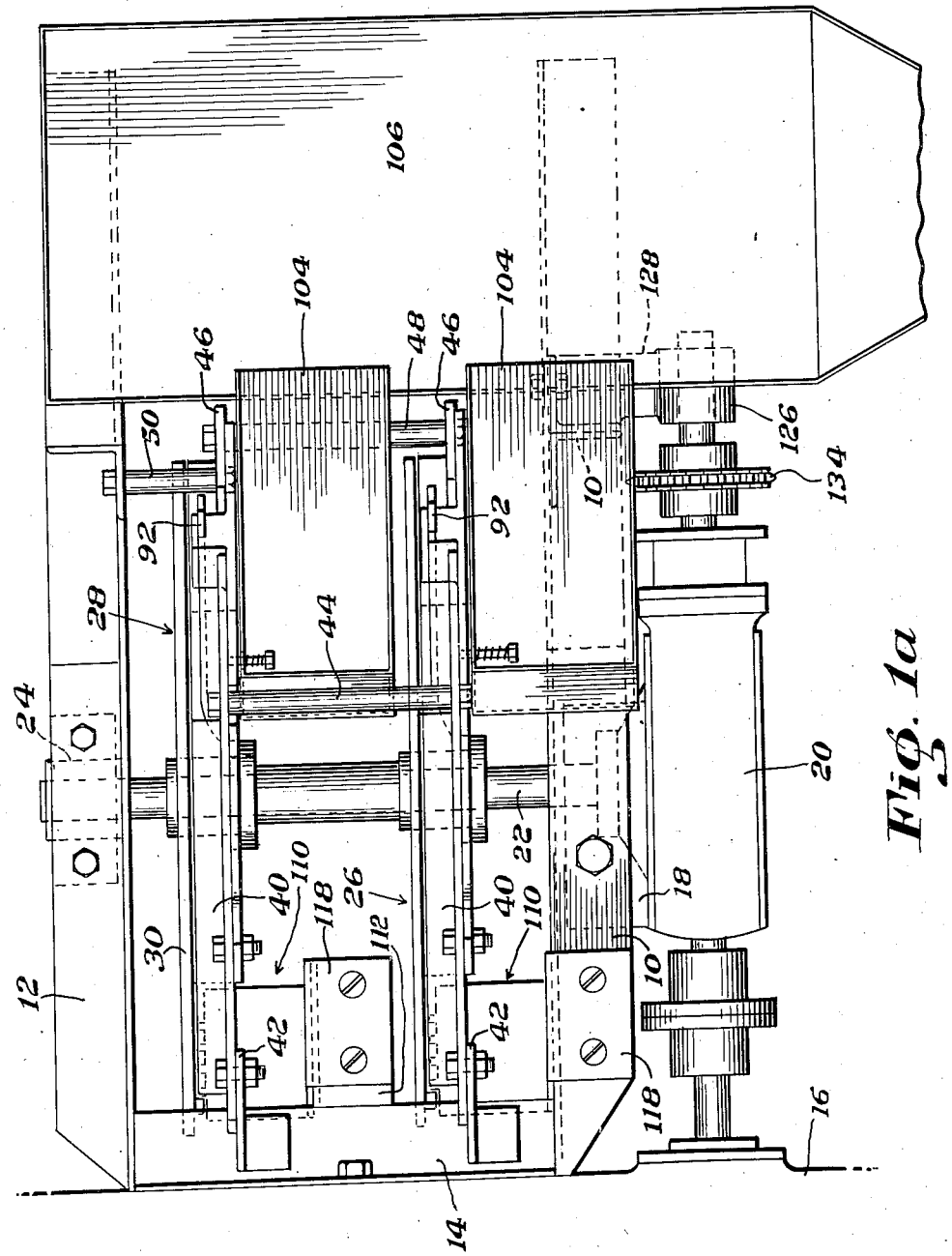

April 12, 1949. O. A. SCHOENING 2,467,158
MACHINE FOR REMOVING MEAT FROM SHELLS
Filed April 27, 1946 4 Sheets-Sheet 3
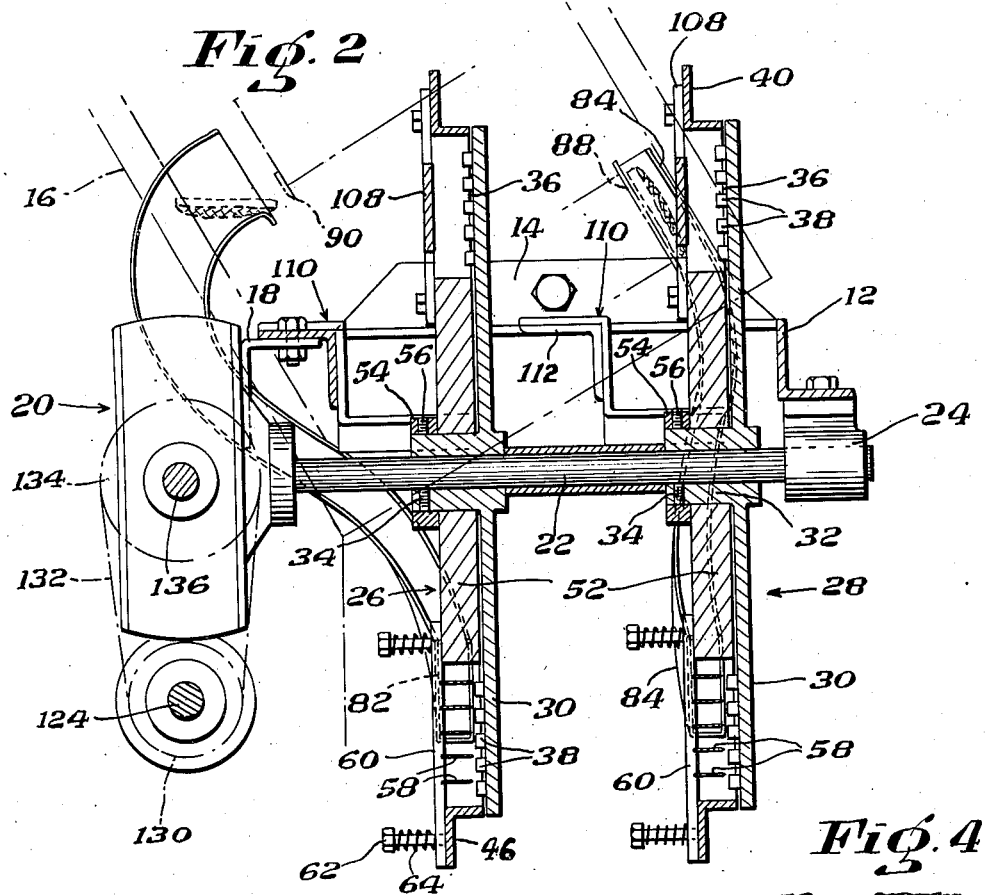
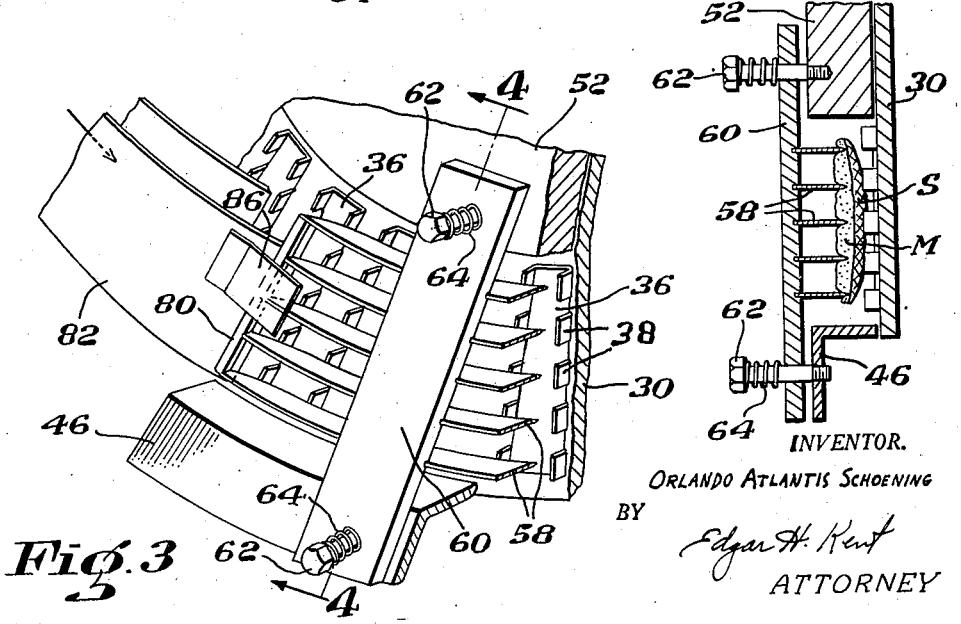
INVENTOR.
ORLANDO ATLANTIS SCHOENING
BY
Edgar H. Kent
ATTORNEY April 12, 1949. O. A. SCHOENING 2,467,158
MACHINE FOR REMOVING MEAT FROM SHELLS
Filed April 27, 1946 4 Sheets-Sheet 4
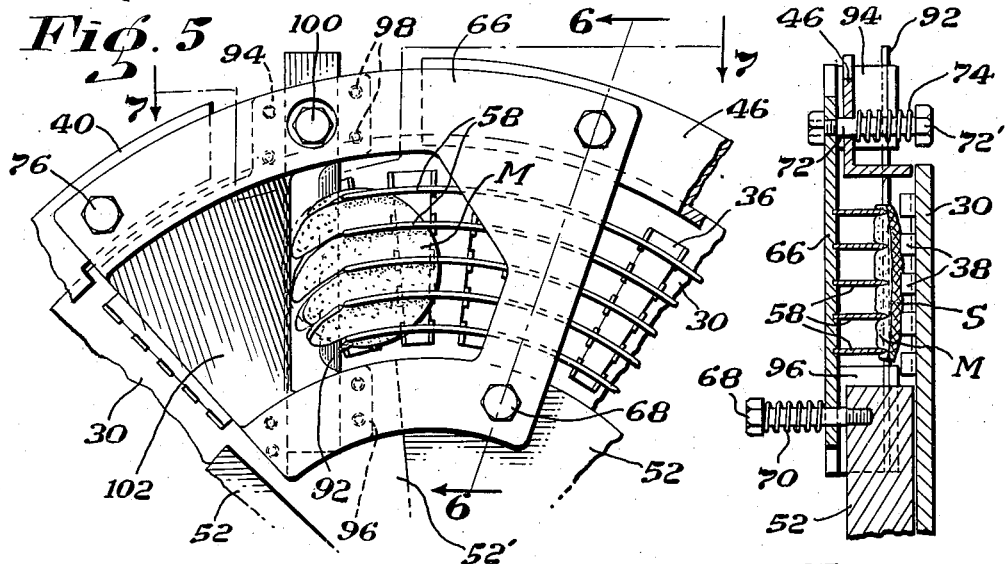
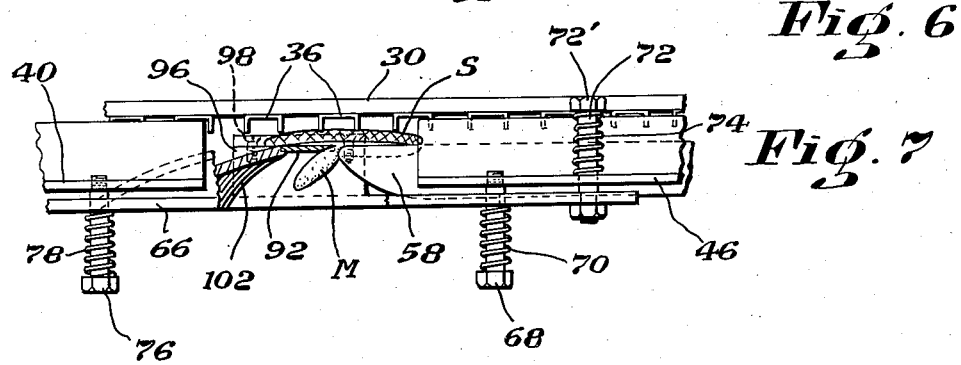
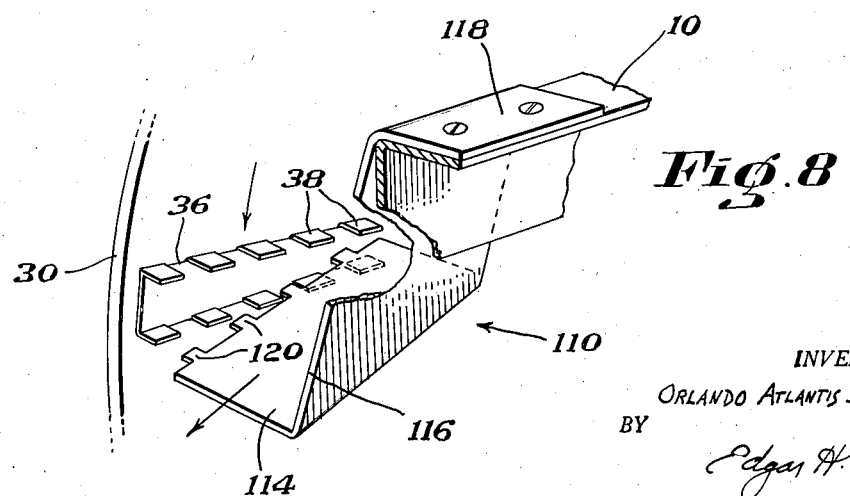
INVENTOR.
ORLANDO ATLANTIS SCHOENING
BY
Edgar H. Kent
ATTORNEY.

Patented Apr. 12, 1949

2,467,158

UNITED STATES PATENT OFFICE 2,467,158

MACHINE FOR REMOVING MEAT FROM SHELLS

Orlando Atlantis Schoening, Lanikai, Territory of Hawaii, assignor to Hawaiian Pineapple Company, Limited, Honolulu, Territory of Hawaii, a corporation of Hawaii Application April 27, 1946, Serial No. 665,442

6 Claims. (Cl. 146—6)

This invention relates to an eradicator machine for removing soft meat from relatively hard tough shells. Particularly, the invention relates to such a machine adapted for the removal of pineapple meat from waste shells.

In the preparation of pineapple for canning, the whole fruit are treated in a coring and sizing machine, usually the familiar "Ginaca" machine (an example of which is disclosed in Ginaca United States Patent No. 1,060,250), which severs the ends (top and butt) from the fruit and cuts a cored cylinder of meat from the remaining portion of the fruit body. Because of the irregularity of the shape of the fruit, this operation leaves a large amount of edible meat attached to the shells. Eradicator apparatus such as described in United States Patents of Stanley No. 2,195,193 and 2,320,054 has been successfully employed for the recovery of substantially all of the edible substance from the main or side portion of the shell but such apparatus is not suitable for treating the end shell sections. Because of the high curvature of the end shell sections and the irregularity of their sizes, shapes and relative thickness of shell and adhering meat, recovery of the meat from the shell ends has generally been regarded as impractical.

An object of the invention is to provide a novel machine of the type referred to which is capable of successfully recovering the meat from waste shell sections of irregular size shape and thickness such as these pineapple ends. Another object is to provide such a machine wherein the meat is accurately removed at its point of juncture with the shell despite such irregularities so that substantially all of the meat is recovered without fouling by inclusion of shell bits. A further object is to provide such a machine having features of construction enabling it to be connected directly to and to operate in conjunction with a coring and sizing machine, such as the Ginaca machine, to receive the end shell sections and automatically process them as they are discharged from the latter machine.

The foregoing and other objects and advantages of the invention will be more fully understood from the ensuing particular description of the invention in conjunction with the appended drawings which, as will be understood, illustrate only a preferred embodiment and application of the invention.

In the drawings:

Fig. 1a is a plan view of the machine;

Fig. 2 is a vertical section view on line 2—2 of Fig. 1, looking in the direction of the arrows;

Fig. 3 is a detail perspective view of a portion of the apparatus shown in Figs. 1 and 1a;

Fig. 4 is a section view on line 4—4 of Fig. 3, looking in the direction of the arrows;

Fig. 5 is a detail side elevation view of another portion of the apparatus shown in Fig. 1 and 1a;

Fig. 6 is a section view on line 6—6 of Fig. 5;

Fig. 7 is a partial section, partial elevation view on line 7—7 of Fig. 5, looking in the direction of the arrows;

Fig. 8 is a fragmentary perspective view of another part of the apparatus of Figs. 1 and 1a.

Figure 1:
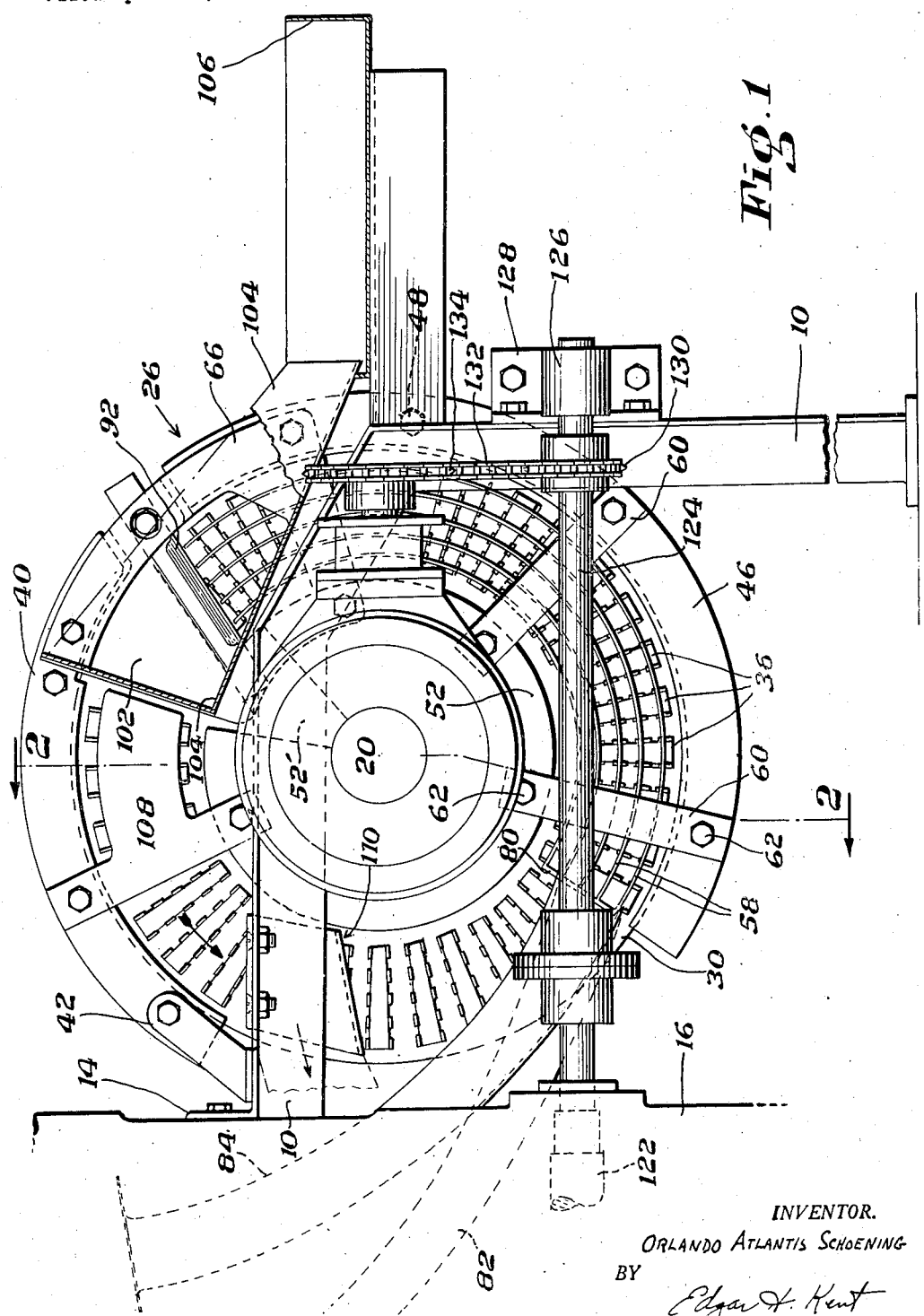
Fig. 1 is a side elevation view of the machine shown attached to a portion of a pineapple coring and sizing machine for processing both the top and butt shell sections removed in the latter machine.

Referring now to the drawings, and first to Figs. 1 and 1a, the machine as shown has a main frame composed of a pair of spaced U-shaped frame members 10 and 12, each of which has a vertically disposed leg which rests on the floor and a horizontally disposed leg which is attached to a cross arm 14 bolted to the frame of a Ginaca machine indicated at 16. Suspended from the horizontal leg of frame member 10 by means of a bracket 18 (Fig. 2) is a differential gear unit 20 from which a driven shaft 22 projects laterally below the frame members and is rotatably mounted at its opposite end in a bearing 24 attached to the horizontal leg of frame member 12.

Shaft 22 is the drive shaft of the eradicator mechanism comprising, as shown, twin eradicator units designated generally by the reference numerals 26 and 28 spaced between frame members 10 and 12. These units are arranged to receive and simultaneously separately process the butt and top end shell sections removed by the Ginaca machine and fed to the units by separate chutes hereinafter described.

Each of the units 26 and 28 comprises (Fig. 2) a vertically disposed conveyor disc 30 having a hub 32 fixed by a set screw 34 to shaft 22 for rotation thereby in a vertical plane. Discs 30 have secured to one face thereof near the periphery a series of closely spaced, radially arranged cleats 36, the purpose of which is to grip the shell of the pineapple ends. The form of cleat shown, which has proved particularly effective, is a U-shaped metal strip secured inverted to the disc face with its long axis radial to the disc axis, the strip having spaced slots cut in its sides to form intervening teeth 38 which engage and grip the shells. The cleats are of tapered construction with their narrower end nearest the axis of the disc so that their sides forming the teeth 38 are substantially radial to that axis.

Each unit has a curved upper frame section 40 (Figs. 1, 1a, 2) fixed at one end to a bracket 42 attached to cross arm 14 (Fig 1a) and extending about and adjacent the upper periphery of disc 30. The two frames 40 are tied together near their forward ends by a tie bolt 44 (Fig. 1a). Each unit also has a second curved frame section 46 extending about the periphery of the disc 30 from a point spaced from the front end of frame section 40 to a point below and to the rear of the axis of the disc. The two frame sections 46 are tied together by a tie bolt 48 (Fig. 1a) and are fixedly supported by means of a support bolt 50 fixed to frame member 12 and to the adjacent frame section 46. The frame sections 40 and 46 may, as shown, be formed of angle iron with one web disposed horizontally (i. e., parallel to the disc axis) and the other vertically, the horizontal web extending toward the cleated face of disc 30 and having its free end disposed close to the disc periphery beyond the outer ends of cleats 36. The horizontal webs of the frame sections form guards to prevent pineapple shell portions from sliding radially off the cleats and discs 30.

Loosely surrounding the hub 32 of each disc 30, opposite the cleated face of disc 30, is a substantially complete disc 52 (Figs. 1 and 2) extending radially from the hub to a point adjacent the inner ends of cleats 36. Hubs 32 are free to rotate within the discs 52 which are held against longitudinal motion with respect to the hubs by the contiguous face of the disc 30 and by a retaining ring 54 (Fig. 2) fastened to the outer end of hub 32 by a set screw 56. The thickness of discs 52 is approximately equal to the length of the horizontal webs of frame sections 40 and 46 so that the peripheries of discs 52 form an inner guard corresponding to the outer guard formed by the frame sections, and the outer surface of the discs 52 is substantially in the same plane as the surface of the vertical web of the frame sections. Frame sections 40, 46 and disc 52 of each eradicator unit define between them a curved processing track to the lower end of which the pineapple ends are fed and along which they are carried by rotation of the discs 30.

Referring particularly to Figs. 1, 2, 3 and 4, there are located in the space between the frame section 46 and the disc 52 a plurality of curved grid bars 58 extending longitudinally of the space in radially spaced relation, the bars being concentric with the axis of rotation of the discs 30 and having their surfaces arranged parallel to that axis. Bars 58 are supported near their lower ends by bars 60 to which their outer edges are made fast, bars 60 extending transversely of the grid bars and being fastened at their opposite ends to frame section 46 and disc 52 by bolts 62. Bolts 62 pass loosely through bars 60 and project substantially above their outer surface. Between the bolt heads and bars 60 are interposed coil springs 64 so that the grid bars are resiliently supported for lateral motion away from disc 30 against the pressure of the springs.

The upper ends of the grid bars are similarly supported by a plate 66 (Figs. 1, 5 and 6) attached at one side to disc 52 by a bolt 68 passing loosely through the plate and having a coil spring 70 interposed between the bolt head and outer surface of the plate and at the other side attached to frame section 46 by a double headed bolt 72 fixed to the plate and extending loosely through the vertical web of frame 46, a spring 74 being interposed between the frame 46 and the head 72' of the bolt to resist movement of the bolt through the frame. Plate 66 is also connected at its upper end (Figs. 5 and 7) to frame section 40 by means of a bolt 76 passing loosely through the plate and having a coil spring 78 interposed between the bolt head and the plate. Plate 66, therefore, supports the upper ends of the grid bars resiliently, permitting lateral motion of the bars away from disc 30 under pressure in the same manner as the lower end supports.

Referring particularly to Fig. 3, the lower ends of the grid bars are tapered outwardly and are joined at their tips by a bar 80 against which abuts the curved end of a feed chute 82 in the case of eradicator unit 26 and a feed chute 84 in the case of eradicator unit 28, under a spring clip 86 on the end of each chute, these chutes receiving the pineapple butts and tops from the Ginaca machine and conducting them to the respective eradicator units. As shown, eradicator unit 26 is arranged to receive the tops and its chute 82 is connected to the top discharging port of the Ginaca machine while unit 28 is arranged to receive the butts and its chute 84 is connected to the butt discharging port of the Ginaca machine. The chutes 82, 84 are in the form of narrow tubes of substantially rectangular cross-section inclined downwardly from the Ginaca machine to the eradicator units, designed to deliver the pineapple end to the eradicator unit disposed in a vertical plane with its shell side toward the disc 30.

The manner in which the chutes 82, 84 are connected into the Ginaca machine is diagrammatically indicated in Fig. 2. The chute 84 extends into the butt discharging port of the Ginaca machine, at the point where the butts of the pineapples carried in the revolving Ginaca turret are severed by a knife indicated at 88. The butts are received by the chute in the position in which they are cut, that is, substantially vertically arranged with their meat face disposed to the left in Fig. 2, and they roll or slide down the chute in that position to the point of entrance into the eradicator unit 28. The chute 82 extends into the top discharging port of the Ginaca machine where the tops are severed by a knife, indicated at 90. Since the meat face of the tops is disposed oppositely to that of the butts and since the two eradicator units are arranged to treat the ends facing in the same direction, the inlet end of chute 82 is arranged to permit the cut top to turn by gravity 180° from its cut position, as indicated in Fig. 2, the chute then conducting the top in its reversed position to the eradicator unit 26.

The discs 30 of the eradicator units are rotated in the counterclockwise direction viewed as in Fig. 1. As the pineapple ends reach the ends of the feed chutes 82, 84, their shells S are gripped by the cleats 36 on the discs and they are carried forwardly with their meat face M pressed into engagement with grid bars 58. The inner edges of the grid bars cut through the meat to the inner surface of the shell along which they slide as the end is carried about the axis of rotation of the disc 30. The shell is tough and is not readily penetrated by the inner edges of the grids, which are rounded as shown in Fig. 4. The grids therefore act to flatten out the ends which are of substantial curvature when presented to the machine. The spring pressure of the resilient mounting for the grids is sufficient to produce this flattening action but insufficient to cause penetration of the shell by the grids so that upon flattening, if the shell thickness is greater than the minimum clearance between the grid bars and cleats, the grids will yield bodily away from the disc 30 until the clearance is equal to the shell thickness. Thus, the units are self adjustable to accommodate ends of widely different shell thickness and jamming of the machine and cutting of the shell are prevented. Also, the grid supports are capable of yielding more at one end than the other, as is desirable in case the shell thickness is different at opposite sides of the top or butt.

As they are carried beyond the opposite or upper ends of the grid bars, the pineapple ends encounter a knife 92 (Figs. 1, 5 and 7) having a flat sharpened cutting edge extending transversely across and contiguous to the ends of the grid bars, the knife edge being disposed at an angle to the radius of the disc 30 as shown in Fig. 1. Knife 92 is mounted at its opposite ends on blocks 94, 96 depending from plate 66, block 94 being located in the space between the adjacent ends of frame sections 40 and 46 and block 96 lying in a gap 52' provided in the support disc 52. The blocks are provided with removable caps fastened by screws 98 and the ends of the knife rest in transverse slots between the blocks and these caps. A bolt 100 extends loosely through plate 66 and is threaded through block 94 so that its end may be tightened against the knife when positioned in the block to prevent endwise movement of the knife. The knife is positioned with its cutting edge in the plane of the inner edges of the grid bars so that it severs the meat from the shells in that plane which is approximately the plane of the inner surface of the flattened shell of the top or butt to which, as previously explained, the inner edges of the grid bars penetrate.

It will be recalled that the plate 66 to which knife 92 is attached forms the resilient support for the upper ends of the grid bars. This is an important feature of the apparatus since the knife is thereby rendered self-adjustable to the plane of the inner surface of the shell, despite wide variations in the thickness of the shell and of the meat layer between successive tops or butts passing through the machine or between opposite sides of a top or butt. Thus the grid acts as a gauge controlling the plane of cut of the knife by the depth of penetration of the grid bars into the meat layer.

As shown in Fig. 5, the meat layer M cut from the shell, which has been subdivided into strips by the action of the grid bars, passes over the knife and onto an outwardly curved guide 102 supported by the plate 66 and projecting through an aperture in the plate into abutting relation with the rear edge of the knife. Guide 102 deflects the meat laterally into a downwardly and forwardly inclined chute 104 supported on plate 66 (Fig. 1a, broken away in Figs. 1 and 5) down which the meat slides into a receiving trough 106 at the front of the machine.

The flattened shells from which the meat has been cut remain engaged with the cleats of disc 30 which carries the shells by its continued rotation beneath the knife and the upper portion of plate 66 and then rearwardly beneath a guard plate 108 bolted to frame section 40 and disc 52 (Fig. 1), which retains the shells against the cleats, to a deflector 110 which separates the shells from the cleats and discharges them from the machine. The deflector for the unit 26 is mounted on the adjacent frame 10 while the deflector for the unit 28 is mounted on a bracket 112 fixed to cross arm 14.

Each deflector, as shown in detail in Fig. 8, is disposed opposite the cleated face of disc 30 and comprises a flat deflector plate 114 arranged in a plane parallel to the axis of rotation of the disc, a guide wall 116 projecting upwardly from the outer edge of plate 114 in a plane substantially normal to said axis, and an attaching flange 118 extending outwardly from the upper edge of wall 116. The inner edge of the plate 114 is provided with projections or teeth 120 which are aligned with and are slightly narrower than the spaces between the teeth 38 of cleats 36 and which project into said spaces to force the shell off the cleats onto the forward flat portion of the plate 114 with a wiping action. Plate 114 slopes downwardly from its inner to its outer ends so that the shells stripped from disc 30 thereby roll or slide from the outer end and fall downwardly between the Ginaca machine and the eradicator and may be conducted away through a suitable chute in the floor.

The machine is driven from the main shaft 122 of the Ginaca machine (Fig. 1) to which an extension 124 is connected and journaled at its end in a bearing 126 on a bracket 128 fixed to frame 10. A sprocket wheel 130 on shaft extension 124 is connected by chain 132 to sprocket 134 on the drive shaft 136 of differential gear unit 20 which operates the drive shaft 22 of the eradicator units, as previously explained.

The machine as shown is especially adapted for operation as an attachment or adjunct to a pineapple coring and sizing machine for recovering meat from the pineapple ends removed in the latter machine. It will be understood, however, that the novel mechanism of the invention may be embodied in other forms than that selected to illustrate the invention and that the utility of said mechanism in the same or other form is not restricted to treatment of pineapple ends but the same may be usefully applied to the treatment of other portions of the pineapple shell and generally to the recovery of a relatively soft layer of meat from a hard, tough, flexible shell or rind.

I claim:

1. An eradicator machine for removing a relatively soft layer of meat from a hard, tough, flexible shell comprising a conveyor having shell gripping means on a face thereof, a knife having a cutting edge extending transversely of the path of travel of the conveyor adjacent the shell gripping face thereof for severing meat from the shells carried by the conveyor, a grid disposed opposite the shell gripping face of the conveyor immediately in advance of said knife and including a plurality of grid bars spaced laterally and extending longitudinally of the path of the conveyor and projecting toward the conveyor to penetrate the meat layer of the shells carried by the conveyor, means resiliently mounting the portion of said grid adjacent said knife for yielding away from the conveyor under predetermined pressure of a shell on said grid bars, and means connecting said knife to said resiliently mounted grid portion for movement of the cutting edge of the knife toward and away from the conveyor in conformity with the movements of said grid portion.

2. An eradicator machine as claimed in claim 1 wherein said resilient mounting means includes resilient supports at each side of said grid and knife member arranged to permit differential yielding of said grid and knife at opposite sides thereof.

3. An eradicator machine for removing a relatively soft layer of meat from a hard, tough, flexible shell comprising a conveyor having a substantially flat surface provided with shell gripping means, means for feeding the shells to the gripping means uniformly with the meat layer outwardly of the conveyor surface, means for flattening the shells against the conveyor surface comprising a grid having bars extending longitudinally and spaced transversely of the path of travel of the conveyor and projecting toward the conveyor so that their inner edges penetrate the meat layer on the shells carried by the conveyor, means resiliently mounting said grid for yielding away from the conveyor under predetermined pressure of a shell on said grid, and a knife fixed to said grid and movable therewith having a cutting edge disposed transversely of the path of travel of the conveyor substantially in the plane of the inner edges of the grid bars for severing a meat layer from a shell carried on the conveyor and flattened by said grid.

4. An eradicator machine as claimed in claim 3 wherein said resilient mounting means includes resilient supports at each side of said grid and knife member arranged to permit differential yielding of said grid and knife at opposite sides thereof.

5. An eradicator machine as claimed in claim 3 which includes a chute associated with said knife for receiving the meat severed from the shells by the knife, and means engageable with the shells subsequent to said knife to separate the shells from said gripping means and remove them from the machine.

6. An eradicator machine as claimed in claim 3 wherein said conveyor is rotatable about an axis normal to the shell gripping face thereof and said grid bars are curved about said axis.

ORLANDO ATLANTIS SCHOENING.

REFERENCES CITED

The following references are of record in the file of this patent:

UNITED STATES PATENTS

| Number | Name | Date |
|---|---|---|
| 661,440 | Burno | Nov. 6, 1900 |
| 1,060,250 | Ginaca | Apr. 29, 1913 |
| 1,102,011 | Cunha | June 30, 1914 |
| 1,264,823 | Lewis | Apr. 30, 1918 |
| 1,350,096 | Fisher | Aug. 17, 1920 |
| 1,370,634 | Dowson | Mar. 8, 1921 |
| 1,444,535 | Barter | Feb. 6, 1923 |
| 2,023,810 | Horner | Dec. 10, 1935 |